Patented May 24, 1949

2,470,830

UNITED STATES PATENT OFFICE 2,470,830

PROCESS OF REMOVING MUD SHEATHS FROM OIL WELLS

Louis T. Monson, Los Angeles County, Calif., assignor to Petrolite Corporation, Ltd., Wilmington, Del., a corporation of Delaware No Drawing. Application January 2, 1947, Serial No. 719,925

19 Claims. (Cl. 252—8.55)

This invention has for its main object to provide a practical process for effectively removing from a well or from an oil- or gas-bearing formation penetrated by a well, a substantially impervious, mud-like sheathing or coating, resulting from the use of drilling fluids in the drilling operation or resulting from the presence in the hole, at some other time, of fluids capable of producing such sheaths.

Another object is to increase the productivity of a well by providing a novel procedure for removing, from the face of the producing formation, various solids, such as natural clays, deposited thereon during drilling or subsequently.

And still another object of my invention is to make possible the recovery of oil or other fluids from relatively shallow formations, which were penetrated during the drilling to greater depths and which were "mudded-off" by deposition of solids from the drilling fluid.

By the term "mudded-off formation" I mean a formation or stratum, the walls of which have been more or less effectively sealed by an impervious sheath of solids derived from the drilling fluid. Naturally-occurring clays are commonly used to prepare drilling fluids. In some cases, drilling wells "make their own mud," the formations encountered containing clay of such properties that it is unnecessary to import the ingredients for preparing the drilling fluids. Where natural clays are found deficient in one or more properties, they may be conditioned to improve their specific gravity characteristics, their viscosity, or their gel-forming propensities by the addition of other materials. For example, weight materials, such as barite or hematite, may be added; or bentonite may be used to improve the viscosity and gel-forming characteristics. In rarer cases, the drilling fluid may be prepared entirely from a weighting material such as barite, and a stabilizer, such as bentonite, in the total absence of naturally-occurring clays or "muds." In this description, I shall use the term "mud" to include drilling fluids of any and all of the foregoing types and to apply to all of them with equal force.

The deleterious effects of drilling muds are of several kinds, the principal one being the deposition of mud sheaths on the face of the formation penetrated. While this deposition of mud sheath is desirable in the upper portions of the hole, it is extremely undesirable when the producing horizon has been reached. It is also undesirable in the upper strata or portions of the hole when and if it later becomes necessary or desirable to test the productivity of such upper strata.

The problem thereby presented exists in wells drilled into high-pressure formations, as well as in wells penetrating low-pressure areas, and in partially or entirely depleted formations. In semi-depleted fields, here formation pressures have declined to small values, the problem is most serious. There are numerous instances on record, where, although wells have been drilled into proven producing horizons, no oil can be commercially produced at present; and where, unless some means is found to remove the sheaths, large reserves of oil will be lost.

Various mechanical means have been attempted to remove the sheaths, with only partial success. Washing with water has been attempted, in many cases unsuccessfully. In the cases of some oil wells previously washed unsuccessfully with water, application of my process has resulted in the removal of a large amount of mud, usually with very gratifying consequences as to increased productivity.

The process which constitutes the present invention may be practised in various ways, and may be applied at various times in the life of a well. It may be applied immediately upon completion of the well, or even prior to completion. It may be used on wells during or upon depletion. It may be used on wells, which, upon depletion of a lower formation, or upon the discovery that such deeper formation is unproductive, have been plugged back to higher formations previously disregarded in drilling and which may now be required to be explored. It may be used on wells, which, because of the presence of such mud sheaths, have never been productive. My process is also applicable to those cases where the sheaths result from mud introduced into a well subsequent to drilling, e. g., for the purpose of killing the well. It is also applicable to those comparatively rare cases where mud sheaths are deposited during cable-tool drilling.

In some instances, the mud used in drilling or re-working a well infiltrates to a greater or lesser depth into the natural formation, where it sets up a barrier to productivity. The present process is applicable to the removal of mud solids occurring as such infiltrated mud sheaths or barriers.

The process constituting my present invention is not to be confused with any process designed to remove clogging deposits of wax, asphaltic materials, paraffin or the like from wells, or to prevent their deposition, such as that disclosed and claimed in my co-pending application Serial No. 719,926, filed January 2, 1947. Such deposits of organic materials constitute a recurring problem. On the contrary, once a mud sheath has been removed by means of the present process, it can never again constitute a problem in that well.

The process which constitutes my invention consists in the application of a reagent of the kind described below to a mud sheath, however produced, which exists in a well, e. g., on the walls of an oil-bearing formation, in such a manner that the relatively impervious sheath is removed, and the well is rendered productive or the existing productivity thereof is increased. The exact nature of the action taking place when the reagent is used is unknown to me.

The reagent which I employ in practising my process consists of a basic acylated aminoalcohol in which an acyloxy radical, derived from a detergent-forming acid having from 8 to 32 carbon atoms, is joined to a basic nitrogen atom by a carbon atom chain, or a carbon atom chain which is interrupted at least once by an oxygen atom, said acylated aminoalcohol being used in combination with one or more water-insoluble organic liquids capable of acting as an oil solvent.

The basic acylated aminoalcohols employed as ingredients of my reagents may have molecular weights ranging from 273 to about 4,000, in monomeric form. The minimum figure is derived by considering the amino-alcohol reactant to be triethanolamine and the acylating agent to be a $C_8$ unsaturated monocarboxy acid. To produce a compound of maximum molecular weight, the acylating agent could furnish three $C_{31}H_{63}CO$ radicals; the element, $OR'$, could be 10 times $OC_{10}H_{20}$; and $R''$ could be a polyaminoalcohol radical, rather than the simple alkanol radical, $HOC_{10}H_{20}$. Such largest elements add up to produce a product of molecular weight 4,000, or slightly higher.

I prefer to employ my reagent in the form of a relatively stable aqueous dispersion. By "relatively stable aqueous dispersion," I mean one that is not resolved into its components spontaneously, on standing for protracted periods of time, e. g., for more than one hour. However, it may be employed in undiluted form or dispersed in oil. In general, I have found the aqueous dispersions to be somewhat more effective. Sometimes, such aqueous dispersions will be effective, whereas, the undiluted reagent or its non-aqueous dispersion or solution will be substantially ineffective.

The basic acylated aminoalcohol employed as an ingredient of the reagent employed in the present process consists of an acylated aminoalcohol in which an acyloxy radical derived from a detergent-forming acid having from 8 to 32 carbon atoms is joined to a basic nitrogen atom by a carbon atom chain, or a carbon atom chain which is interrupted at least once by an oxygen atom. The aminoalcohols may have more than one amino radical, or, for that matter, more than one basic amino radical. The compounds herein contemplated as ingredients of my reagent are well-known compounds and are produced by conventional procedures. Stated another way, the compounds herein contemplated are esters of aminoalcohols which may contain ether linkages, as well as more than one amino nitrogen atom.

The phrase "basic amino nitrogen atom" is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen, is sufficient to destroy the ordinary basic properties." Textbook of Organic Chemistry, Richter, Second edition, page 253.)

Reference to an amine and the subsequent amino compounds is intended to include the salts and the anhydro base. In instances where water is present, the term includes the hydrated base, as well. Both the anhydro base and the hydrated base are obviously present when an aqueous system is being subjected to the reagent, or when the reagent is used as a water solution or dispersion. ("In an aqueous solution of the amine, the anhydro base, $R-NH_2$, the hydrated base, $R-NH_3-OH$, and the two ions are all present." Richter, s. v., page 252.)

As has been previously stated, the reagents contemplated as ingredients in the compositions employed in the present process are old and well known products. For convenience, and for purpose of brevity, reference is made to the following three United States Patents to De Groote and Keiser, to wit: Nos. 2,324,488, 2,324,489 and No. 2,324,490, all dated July 20, 1943. Said patents are concerned with processes for breaking water-in-oil emulsions. The demulsifying agent employed is in each instance the resultant derived by reaction between a certain fractional ester and an acylated amino-alcohol. The aminoalcohols described collectively in the aforementioned three patents are used as reactants for combining with a fractional acidic ester. Thus, said aminoalcohols must have present an alcoholiform hydroxyl as part of an acyl radical, or as part of a substituent for an amino hydrogen atom. In the instant case, such aminoalcohols are not employed as reactants, except as to salt formation reactions, and the hydroxyl group is not functional. Thus, one may employ, not only the aminoalcohols described in the three aforementioned United States patents, but also the obvious analogues, in which there is no hydroxyl radical present. Subsequently, reference will be made to this particular type and examples will be included.

Aforementioned U. S. Patent No. 2,324,488 describes hydroxylated acylated amino-ether compounds containing:

(a) A radical derived from a basic hydroxyaminoether and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxyamine radicals, amido hydroxyamine radicals, and aryl alkanolamine radicals; said basic hydroxy-amino-ether radical being characterized by containing not more than 60 carbon atoms; and (b) An acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical.

Aforementioned U. S. Patent No. 2,324,489 describes hydroxylated acylated monoamino compounds free from ether linkages, said hydroxylated acylated amino compounds being of the following type:

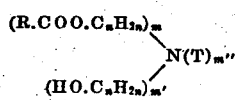

In which R.COO represents the oxy-acyl radical derived from a monobasic detergent-forming acid; T represents a member of the class consisting of hydrogen atoms, non-hydroxyl hydrocarbon radicals, and acylated radicals, obtained by replacing a hydrogen atoms of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1 or 2; with the proviso that $m+m'+m''=3$.

Aforementioned U. S. Patent No. 2,324,490 describes basic hydroxylated acylated polyamino compounds free from ether linkages, said compounds being of the following formula:

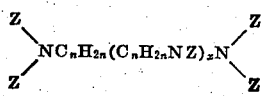

in which $n$ represents a small whole number varying from 2 to 10; $x$ is a small whole number varying from 0 to 10; Z is a member of the class consisting of H, RCO, R'CO, and D, in which RCO represents an acyl radical derived from a detergent-forming monocarboxy acid; R'CO is an acyl radical derived from a lower-molecular weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polamine is further characterized by the fact that there must be present a member of the class consisting of (a) Acyloxyalkylene radical in which the acyl group is RCO; and (b) Joint occurrence of an amino radical in which the acyl group is RCO and a hydroxyalkyl radical.

A description of certain high molal monocarboxy acids, and, more particularly, those commonly referred to as detergent-forming monocarboxy acids, appears in U. S. Patent No. 2,324,490. For convenience, the following description is substantially a verbatim form of the same subject-matter as it appears in said patent.

"It is well known that certain monocarboxy organic acids containing eight carbon atoms or more, and not more than 32 carbon atoms, are characterized by the fact that they combine with alkali to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

"The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields."

I have found that the acylated aminoalcohol ingredient of the composition of matter herein described, and employed in the present process, is preferably derived from unsaturated fatty acids having 18 carbon atoms. Such unsaturated fatty acids include oleic acid, recinoleic acid, linoleic acid, linolenic acid, etc. One may employ mixed fatty acids, as, for example, the fatty acids obtained from hydrolysis of cottonseed oil, soyabean oil, etc. The preferred acylated aminoalcohol ingredient of my reagent is obtained from unsaturated fatty acids, and, more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefine, with steam, or by causing a halogenated hydrocarbon to act with potassium cyanide and saponifying the product obtained. Such products or mixtures thereof, having at least 8 and not more than 32 carbon atoms and having at least one carboxyl group, or the equivalent thereof, are suitable as detergent-forming monocarboxy acids; and another analogous class, equally suitable, is the mixture of carboxylic acids obtained by the alkali treatment of alcohols of higher molecular weight formed in the catalytic hydrogenation of carbon monoxide.

As is well known, one need not use the high molal carboxy acid, such as a fatty acid, for introduction of the acyl group or acyloxy group. Any suitable functional equivalent such as the acyl halide, the anhydride, ester, amide, etc., may be employed.

The reagent employed in the present process includes an aminoalcohol ester, as described; and particular attention is directed to the fact that, although such esterified aminoalcohol need not contain a hydroxyl radical, my preferred form is the hydroxylated type. Other aminoalcohol esters of the kind herein contemplated are described in U. S. Patent No. 2,259,704, dated October 21, 1941, to Monson and Anderson.

In light of what has been said, it hardly appears necessary to include a list of reactants and reagents derivable therefrom. However, for convenience, the following amines are included. Suitable primary and secondary amines, which may be employed to produce materials of the kind above described, include the following: Diethanolamine, monoethanolamine, ethylethanolamine, methylethanolamine, propanolamine, dipropanolamine, propylpropanolamine, etc. Other examples include cyclohexylolamine, dicyclohexylolamine, cyclohexylethanolamine, cyclohexylpropanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: Triethanolamine, diethanolalkylamines such as diethanolethylamine, diethanolpropylamine, etc. Other examples include diethanolmethylamine, tripropanolamine, dipropanolmethylamine, cyclohexanoldiethanolamine, dicyclohexanolethanolamine, cyclohexyldiethanolamine, dicyclohexylethanolamine, dicyclohexanolethylamine, benzyldiethanolamine, benzyldipropanolamine, tripentanolamine, trihexanolamine, hexyldiethanolamine, octadecyldiethanolamine, etc.

Additional amines include ethanoldiethylamine, propanoldiethylamine, ethanoldipropylamine, propanoldipropylamine, dibenzylethanolamine, etc. Ether-type aminoalcohols may be obtained from the above-mentioned aminoalcohols, for example, by treating them with one or more moles of an oxyalkylating agent such as ethylene oxide, propylene oxide, butylene oxide, glycid, etc. It is to be noted that comparable products are obtained by treating primary or secondary amines other than arylamines with an olefin oxide. Aminoalcohols containing a primary or secondary amino group, i. e., having at least one or two amino hydrogen atoms present, may be employed under especially controlled conditions to give an ester, rather than an amide. One procedure is to permit amidification to take place, and then cause a rearrangement to the ester form. See U. S. Patent No. 2,151,788, dated March 28, 1939, to Jauersberger.

AMINOALCOHOL ESTER
Example 1

On pound mole of ricinoleic acid is reacted with one pound mole of triethanolamine at approximately 180° to 240° C. for approximately 10 to 25 hours, until there is substantially complete esterification.

AMINOALCOHOL ESTER
Example 2

Ricinoleic acid in the preceding example is replaced by methyl naphthenate.

AMINOALCOHOL ESTER
Example 3

Methyl abietate is substituted for ricinoleic acid in Example 1, preceding.

AMINOALCOHOL ESTER
Example 4

Ethyl oleate is substituted for ricinoleic acid in Example 1, preceding.

AMINOALCOHOL ESTER
Example 5

One pound mole of triethanolamine is reacted with one pound mole of ethylene oxide and the etherized amine so obtained is substituted for triethanolamine in Examples 1 to 4, preceding.

AMINOALCOHOL ESTER
Example 6

One pound mole of triethanolamine is reacted with two pound moles of ethylene oxide and the etherized amine so obtained is substituted for triethanolamine in Examples 1 to 4, preceding.

AMINOALCOHOL ESTER
Example 7

One pound mole of triethanolamine is reacted with three pound moles of ethyleneoxide and the etherized amine so obtained is substituted for triethanolamine in Examples 1 to 4, preceding.

AMINOALCOHOL ESTER
Example 8

One pound mole of triethanolamine is reacted with 4 to 6 pound moles of ethylene oxide and the etherized amine so obtained is substituted for triethanolamine in Examples 1 to 4, preceding.

AMINOALCOHOL ESTER
Example 9

One pound mole of ethanoldiamylamine obtained by reacting one pound mole of diamylamine with one pound mole of ethylene oxide is employed in place of triethanolamine in Examples 1 to 4, preceding.

AMINOALCOHOL ESTER
Example 10

The same procedure is employed as in the preceding example, except that an etherized amine is obtained by treating diamylamine with 2, 3 or 4 moles of ethylene oxide, and such etherized amine is employed instead of ethanol diamylamine.

AMINOALCOHOL ESTER
Example 11

One pound mole of castor oil is reacted with 3 pound moles of triethanolamine, as described in the aforementioned U. S. Patent No. 2,324,489 to De Groote and Keiser, under the heading "Intermediate Hydroxylated Amine, Example 1."

AMINOALCOHOL ESTER
Example 12

The same procedure is followed as in the preceding example, except that either one pound mole or two pound moles of glycerol are added to the reaction mass consisting of one pound mole of castor oil and three pound moles of triethanolamine.

AMINOALCOHOL ESTER
Example 13

The resultants obtained in Examples 1 to 4, preceding, are treated with equal molal ratios of an olefin oxide.

AMINOALCOHOL ESTER
Example 14

One follows the directions of U. S. Patent No. 2,293,494, to De Groote and Keiser, dated August 18, 1942, to produce an amine of the following composition:

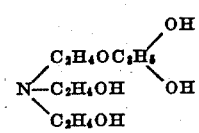

Such amine is substituted for triethanolamine in the preceding examples.

AMINOALCOHOL ESTER
Example 15

One pound mole of hydroxyethyl ethylenediamine is reacted with 4 moles of ethylene oxide to give the corresponding tetrahydroxylated derivative. Such compound is employed in place of triethanolamine in the preceding examples.

Aminoalcohol Ester
Example 16

The same procedure is followed as in the preceding example, except that 5 to 8 moles of ethylene oxide are employed instead of 4 moles.

Aminoalcohol Ester
Example 17

The same procedure is employed as in the preceding example, except that diethylenetriamine is substituted for ethylenediamine.

Aminoalcohol Ester
Example 18

An amine of the following composition:

$$\begin{array}{c} HOC_2H_4 \\ \phantom{HOC_2H_4} \diagdown \\ \phantom{HOC_2H_4\diagdown} NC_2H_4OC_2H_4N \\ \phantom{HOC_2H_4} \diagup \\ HOC_2H_4 \end{array} \begin{array}{c} C_2H_4OH \\ \diagup \\ \\ \diagdown \\ C_2H_4OH \end{array}$$

or $$\begin{array}{c} HOC_2H_4 \\ \diagdown \\ NC_2H_4OC \cdot C \cdot COC_2H_4N \\ \diagup \\ HOC_2H_4 \end{array} \begin{array}{c} H\ OH\ H \\ \cdot\ \cdot\ \cdot \\ \\ H\ H\ H \end{array} \begin{array}{c} C_2H_4OH \\ \diagup \\ \\ \diagdown \\ C_2H_4OH \end{array}$$

is substituted for ethylenediamine in the preceding examples.

Aminoalcohol Ester
Example 19

In the preceding examples, where more than one high molal acyl radical can be employed, two ricinoleyl radicals or the equivalent are introduced into the polyaminoalcohol.

Aminoalcohol Ester
Example 20

Unsymmetrical diphenyldiethylenetriamine is treated with ethylene oxide and substituted for oxyethylated ethylenediamine in the preceding examples.

Aminoalcohol Ester
Example 21

Symmetrical diacetyltriethylenetetramine is treated with 4 moles of ethylene oxide and substituted for oxyethylated ethylenediamine in the preceding examples.

Aminoalcohol Ester
Example 22

Additional examples are prepared in the manner previously described, except that one employs aminoalcohols obtained by the oxyalkylation of morpholine; 1,3-diamino-2-propanol; 2-amino-1-butanol; 2-amino-2-methyl-1-propanol; 2-amino-2-methyl-1,3-propanediol; 2-amino-2-ethyl-1,3-propanediol; tris(hydroxymethyl)-aminomethane; or piperidine. One may use enough of the olefin oxide, for instance, ethylene oxide, to convert all amino hydrogen atoms into hydroxyethyl radicals, or one may employ a greater amount so as to introduce ether linkages in addition.

Aminoalcohol Ester
Example 23

The same procedure is followed as in Example 22, preceding, except that one employs the amines described in Examples 9, 10, 11, and 13 of U. S. Patent No. 2,306,329, to DeGroote & Keiser, dated December 22, 1942.

Aminoalcohol Ester
Example 24

Soyabean oil, blown soyabean oil, blown castor oil, or blown teaseed oil is substituted for castor oil in the preceding examples.

In the above examples it is obvious that free hydroxyl radicals may be present as part of a hydroxyalkyl radical or as part of the acyl radical of a fatty acid such as ricinoleic acid.

Some of the acylated aminoalcohols contemplated as ingredients in my reagent are freely dispersible in water in the free state. Presumably such aqueous systems comprise the reagent in the form of a base, i. e., a substituted ammonium compound. In other instances, the free forms of the reagents are substantially water-insoluble, but the salt forms (e. g., the acetates) are very water-dispersible. I prefer to employ the acylated aminoalcohol in water-dispersible form. In some instances, therefore, it is desirable to neutralize the acylated aminoalcohol to produce a salt which will be water-dispersible. I have found, for example, that the acetate, hydroxyacetate, lactate, gluconate, propionate, caprate, phthalate, fumarate, maleate, benzoate, succinate, oxalate, tartrate, chloride, nitrate or sulfate, prepared by addition of the suitable acid to the acylated aminoalcohol, usually constitutes a reagent which is somewhat more soluble or dispersible in water than the original acylated aminoalcohol. It is to be understood that references to an acylated aminoalcohol, in these specifications and claims, include the reagent in the form of salts, as well as in the free form, and the hydrated form.

As an example of a preferred type of acylated aminoalcohol reagent which is effective as an ingredient in the composition used in my process, the following is submitted: I prepare a mixture of diamino and triamino materials which correspond essentially to either one of the two following type forms:

$$\begin{array}{c} HOC_2H_4 \\ \diagdown \\ NC_2H_4OC_2H_4N \\ \diagup \\ HOC_2H_4 \end{array} \begin{array}{c} C_2H_4OH \\ \diagup \\ \\ \diagdown \\ C_2H_4OH \end{array}$$

$$\begin{array}{c} HOC_2H_4 \\ \diagdown \\ NC_2H_4OC_2H_4N \\ \diagup \\ HOC_2H_4 \end{array} \begin{array}{c} \phantom{X} \\ C_2H_4OC_2H_4N \\ \phantom{X} \\ C_2H_4OH \end{array} \begin{array}{c} C_2H_4OH \\ \diagup \\ \diagdown \\ C_2H_4OH \end{array}$$

After determining the average molecular weight of such mixture, I combine the same with the ricinoleyl radical by heating it with castor oil in the proportion of 1 pound mole of castor oil for 3 pound moles of the mixed amines, "pound mole" in the latter case being calculated on the average molecular weight, as determined. Such mixture is heated to approximately 160–260° C. for approximately 6 to 25 hours, until reaction is complete, as indicated by the disappearance of all of the triricinolein present in the castor oil. Castor oil is used instead of some other source of ricinoleyl radical, e. g., ricinoleic acid, in the example because of its ready commercial availability and lower price.

Depending on the choice of acylated amino body and its molecular weight, the solubility may be expected to range from ready water-solubility in the free state to substantial water-insolubility. As stated above, the salts, and specifically the acetates, generally show improved water-solubility over the simple acylated amino bodies; and I have obtained the best results by using salt forms of the acylated amino bodies which possess appreciable water-solubility.

The other component of my reagent is a water-insoluble organic liquid which is capable of acting as an oil solvent. Many materials lend themselves to this use. One of the commonest is the aromatic fraction of petroleum distillates which is quite generally found to disperse the acylated aminoalcohols, mentioned above. Another is the fraction removed from distillates by application of the Edeleanu liquid sulfur dioxide extraction process, and which comprises aromatic and unsaturated compounds. In some cases, stove oil or similar petroleum distillate is usable. Oil solvents like carbon tetrachloride or carbon disulfide are usable, although their comparatively high cost militates against their use. Amylene dichloride is sometimes a desirable material for the present purpose, as are tetrachloromethane, tetralin, trichloroethylene, benzol and its homologues, cyclohexane, etc. This component of my reagent must be water-insoluble and must be an oil solvent. Otherwise, its selection is not limited, although it should be compatible with the other ingredient of my reagent. Naturally, its cost and availability will influence the selection. I prefer to use aromatic petroleum solvent, as a widely available reagent of low cost and good properties for the present use.

I do not desire to be limited to any specific water-insoluble organic liquid, other than that it shall be capable of acting as an oil solvent. The choice of liquid employed is influenced in part by the bottom-hole temperatures expected to be encountered. The character of the oil being produced may also affect the choice, and the character of the mud used in drilling the well may also be important. The choice will frequently depend upon relative cost of solvents.

I have found that a mixture of organic liquids having the specific property of dissolving petroleum oil is very effective. One such mixture which I have employed contains benzol, toluol, carbon tetrachloride, tetralin and kerosene. These solvents are exactly those disclosed in my earlier Patent No. 2,153,589, referred to elsewhere herein. The proportions of these solvents recited in said earlier patent are equally satisfactory for use in preparing the present reagent. Such proportions recited in said earlier patent are: benzol, 35 lbs.; toluol, 15 lbs.; carbon tetrachloride, 16 lbs.; tetralin, 40 lbs.; and kerosene, 8 lbs.

To prepare my reagent, one simply mixes the two components together in suitable proportions. The optimum proportion of each will vary, depending upon its properties; but in general, the resulting mixture should be homogeneous.

I also require that the finished reagent produce a relatively stable aqueous dispersion in water, as noted above. In cases where the two ingredients form thoroughly homogeneous mixtures, which, however, are not water-dispersible, transformation of the acylated aminoalcohol component into its salt form will sometimes accomplish this purpose. In such cases, I have preferably employed acetic acid to effect this neutralization.

The reagent is preferably employed in the form of an aqueous dispersion, although sometimes favorable results are obtained merely by introducing the undiluted reagent into the well whose productivity is to be improved. In some of such cases, undoubtedly, there is produced, in the well bore or in the formation, an aqueous dispersion of the reagent, from water present in such bore or such formation. Production of an aqueous dispersion from my reagent and water is accomplished almost spontaneously on mixing the two, in most cases. I greatly prefer to employ the reagent in the form of an aqueous dispersion, because in that manner the two components are prevented from separating from each other before the reagent can become effective to remove the mud sheaths.

The present reagent has certain advantages over other reagents which have been suggested for the same purpose. For example, the present reagent has been found to be quite stable in the presence of fairly saline water and in the presence of fairly hard water, over a period ranging from at least several hours to at least several days. Reagents like those of my earlier U. S. Patent No. 2,135,589, dated November 8, 1938, which include sulfonated saponifiable oil, react with hard water to produce insoluble precipitates of such sulfonated saponifiable oil; and such constituents of such reagents are "salted-out" by saline waters. The present reagent, in contrast, is unaffected by waters of appreciable salinity and/or hardness. In fact, as stated above, I have made it into aqueous dispersions of good stability, using such waters.

It is also noteworthy that my present reagent is useful in the presence of acids. It may therefore be applied satisfactorily to wells that have been acidized by the use of hydrochloric or hydrofluoric or other acid. The reagents of my former patent, above-mentioned, would react with such acidizing acids to liberate free sulfonated fatty acids, which would either be water-insoluble per se, or else would readily become water-insoluble on hydrolysis and loss of their acid sulfate radical. The present reagent would be quite stable in the presence of such acidizing acids.

I prefer to employ a considerable excess of acylated aminoalcohol over what would be exactly required to effect dispersion of the water-insoluble organic liquid in water. Such excess further prevents any separation of the phases, enhancing the stability of the dispersion to such an extent that it will remain stable for at least several hours. The excess of acylated aminoalcohol also acts to lower the surface tension of the whole reagent, because of which the reagent exhibits a marked penetrating effect. In this way, it is carried into the crevices and irregularities of the deposit, weakening the bond between the mud sheath and the supporting wall. It is also enabled by this means to penetrate the formation to considerable distances and to facilitate the return of drilling water to the hole.

The proportions of oil solvent and acylated aminoalcohol may be varied within wide limits. For example, I have prepared my reagent in one form, in which it contained 4 parts of acylated aminoalcohol to 1 part of oil solvent. I have likewise prepared it in a form in which it contained 4 parts of oil solvent to 1 part of acylated aminoalcohol. Both forms were relatively stable, and did not separate appreciably into their components, on standing for protracted periods of time. I have likewise prepared my reagent in a form in which it contained 9 parts of acylated aminoalcohol and 1 part of oil solvent; and in a form in which it contained 1 part of acylated aminoalcohol and 9 parts of oil solvent. I have thereby determined that use of the acylated aminoalcohol and the oil solvent within the range of proportions, 9:1 and 1:9, is practicable, in producing my reagent. Therefore, I do not wish to be limited to the exact proportions of ingredients recited in the following example, or to those specific ingredients recited, the example given being merely illustrative.

As a preferred example of reagent, I employ a 20% dispersion of the preferred acylated aminoalcohol mentioned above, in aromatic petroleum solvent, including 2% of concentrated acetic acid in the finished reagent. I prefer to employ this reagent in the form of a dilute aqueous dispersion, of about 5% concentration. Sometimes aqueous dispersions containing as little as 1% of the reagent are fully effective. Sometimes it is desirable to introduce the reagent in the form of a more concentrated aqueous dispersion, as when additional water is expected to be encountered in the well bore or the surrounding formation. The reagent may even be introduced in undiluted form, although, as stated above, I prefer not to use it in this form.

From the foregoing, it will be understood that my invention, broadly stated, consists in subjecting a mud sheath, of the kind mentioned, to the action of a reagent of the kind described. Merely injecting such reagent into a well which has been mudded-off sometimes results in the more or less complete removal of the sheath. I have found that agitating the reagent in the well, after it has been injected therein, usually produces more favorable results, however. Any of the various methods available for agitating fluid in the hole, such as swabbing or use of perforation washers, may be applied during the injection of the reagent, or before or after the period during which the reagent may be allowed to stand quiescent in the well. I have found that agitating the fluid after allowing the reagent to stand in the well for a period of time, in order to penetrate and soften the sheaths, produces very favorable results. If a perforation washer is employed to agitate the fluid, it may be desirable to "spot" therewith, i. e., inject at various levels, additional quantities of the reagent, before agitating.

My preferred method of cleaning an oil well of mud sheaths is as follows: Remove any debris present in the bottom of the hole, for example, by bailing. Then replace the head of the oil standing in the well as completely as possible with a 5% aqueous dispersion of the reagent. Allow the dispersion to stand in the hole for any desirable time. (I have found that a period of standing ranging from 8 to 24 hours produces acceptable results). Then introduce an additional quantity of dispersion into the well, and immediately thereafter agitate the fluid in the well by swabbing or operating a perforation washer therein. After agitating the dispersion in the hole by any desired means, and so scrubbing or washing the sheath from the formation walls, swabbing or other means may be employed, if required or desired, to bring additional quantities of mud into the hole, and to start a flow of oil. The debris dislodged by the use of my reagent may be removed with a bailer, or in any other desired manner. The well is preferably not put on the pump until no further amounts, or only small amounts, of mud are being recovered.

The above-recited procedure for operating this process is exemplary only. The procedure may be varied, as conditions may require. In all cases, however, it consists broadly in the application of my reagent to the mud sheaths; and, of course, subsequently removing from the well the debris accumulated in the well as the result of such application.

It will be obvious that my process is applicable to the removal of any mud sheath present on the perforated pipe in the well, in addition to that present on the walls of the formation. The removal of the sheath from the formation wall, I consider the more important function of my process, however.

Having thus described my invention, what I claim as new and desire to secure by Letters Patent is:

1. A process for the removal of mud sheaths from geological formations penetrated in the drilling of wells, characterized by the application thereto of a reagent comprising a mixture of (a) an acylated derivative of a basic aminoalcohol of the formula:

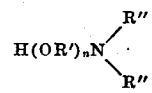

said derivative being such that there is at least one occurrence of the radical RCO, which is the acyl radical of a monocarboxy detergent-forming acid having at least 8 and not more than 32 carbon atoms; the amino nitrogen atom is basic; $R''$ is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; $R'$ is an alkylene radical having at least 2 and not more than 10 carbon atoms; and $n$ is a small whole number varying from 1 to 10; RCO being a substituent for a hydroxyl hydrogen atom; and the molecular weight of said compound being at least 273 and not over 4,000; said amino compound being selected from the class consisting of the anhydro base, the hydrated base, and salts; and (b) a water-insoluble oil solvent; the proportions of (c) and (b) lying between 1 to 9 and 9 to 1.

2. A process for the removal of mud sheaths from geological formations penetrated in the drilling of wells, characterized by the application thereto of a relatively stable aqueous dispersion of a reagent comprising a mixture of (a) an acylated derivative of a basic amino-alcohol of the formula:

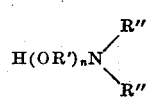

said derivative being such that there is at least one occurrence of the radical RCO, which is the acyl radical of a monocarboxy detergent-forming acid having at least 8 and not more than 32 carbon atoms; the amino nitrogen atom is basic; $R''$ is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; and $n$ is a small whole number varying from 1 to 10; RCO being a substituent for a hydroxyl hydrogen atom; and the molecular weight of said compound being at least 273 and not over 4,000; said amino compound being selected from the class consisting of the anhydro base, the hydrated base, and salts; and (b) a water-insoluble oil solvent; the proportions of (a) and (b) lying between 1 to 9 and 9 to 1.

3. A process for the removal of mud sheaths from geological formations penetrated in the drilling of wells, which consists in the application thereto of a relatively stable aqueous dispersion of a reagent comprising a mixture of (a) an acylated derivative of a basic amino alcohol of the formula:

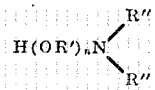

said derivative being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; and $n$ is a small whole number varying from 1 to 10; RCO being a substituent for a hydroxyl hydrogen atom; and the molecular weight of said compound being at least 273 and not over 4,000; said amino compound being selected from the class consisting of the anhydro base, the hydrated base, and salts; and (b) a water-insoluble oil solvent; the proportions of (a) and (b) lying between 1 to 9 and 9 to 1; and subsequently removing from the well the solids which formerly constituted such sheaths.

4. The process of claim 2, wherein the aminoalcohol contains more than one basic amino nitrogen atom.

5. The process of claim 2, wherein the aminoalcohol contains at least 2 and not more than 4 basic amino nitrogen atoms.

6. The process of claim 2, wherein the aminoalcohol contains at least 2 and not more than 4 basic amino nitrogen atoms and at least one free hydroxyl radical.

7. The process of claim 2, wherein the aminoalcohol contains at least 2 and not more than 4 basic amino nitrogen atoms and a plurality of free hydroxyl radicals.

8. The process of claim 2, wherein the aminoalcohol contains at least 2 and not more than 4 basic amino nitrogen atoms, a plurality of free hydroxyl radicals, and at least one ether radical.

9. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom.

10. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is a higher fatty acid acyl radical.

11. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is a higher fatty acid acyl radical having 18 carbon atoms.

12. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is an unsaturated higher fatty acid acyl radical having 18 carbon atoms.

13. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO, occurring only once, is an unsaturated higher fatty acid acyl radical having 18 carbon atoms.

14. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an unsaturated higher fatty acid acyl radical having 18 carbon atoms; and wherein the value of $n$ is unity.

15. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an unsaturated higher fatty acid acyl radical having 18 carbon atoms; and wherein the value of $n$ is unity and R' is an alkylene radical having at least 2 and not more than 3 carbon atoms.

16. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an unsaturated higher fatty acid acyl radical having 18 carbon atoms; wherein the value of $n$ is unity and R' is an alkylene radical having at least 2 and not more than 3 carbon atoms; and wherein the molecular weight is less than 1,000.

17. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is a ricinoleyl radical; wherein the value of $n$ is unity and R' is an alkylene radical having at least 2 and not more than 3 carbon atoms; and wherein the molecular weight is less than 1,000.

18. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an oleyl radical; wherein the value of $n$ is unity and R' is an alkylene radical having at least 2 and not more than 3 carbon atoms; and wherein the molecular weight is less than 1,000.

19. The process of claim 2, wherein the aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurrying only once, is a linoleyl radical; wherein the value of $n$ is unity and R' is an alkylene radical having at least 2 and not more than 3 carbon atoms; and wherein the molecular weight is less than 1,000.

LOUIS T. MONSON.

REFERENCES CITED

The following references are of record in the file of this patent:

UNITED STATES PATENTS

| Number | Name | Date |
| --- | --- | --- |
| 2,135,589 | Monson | Nov. 8, 1938 |
| 2,371,429 | De Groote et al. | Mar 13, 1945 |
| 2,382,612 | De Grotte et al. | Aug. 14, 1945 |
| 2,384,608 | De Groote et al. | Sept. 11, 1945 |
| 2,386,937 | De Groote et al. | Oct. 16, 1945 |